(12) United States Patent
El-Jawahri et al.

(10) Patent No.: US 11,247,629 B1
(45) Date of Patent: Feb. 15, 2022

(54) VEHICLE AIRBAG

(71) Applicant: Ford Global Technologies, LLC, Dearborn, MI (US)

(72) Inventors: Raed Essa El-Jawahri, Northville, MI (US); Agnes S. Kim, Dearborn, MI (US); Cortney Stancato, Novi, MI (US); Ming Shen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/994,781

(22) Filed: Aug. 17, 2020

(51) Int. Cl.
*B60R 21/207* (2006.01)
*B60R 21/2165* (2011.01)
*B60R 21/00* (2006.01)
*B60R 21/0136* (2006.01)
*B60R 21/264* (2006.01)

(52) U.S. Cl.
CPC ........ *B60R 21/207* (2013.01); *B60R 21/0136* (2013.01); *B60R 21/2165* (2013.01); *B60R 21/264* (2013.01); *B60R 2021/0053* (2013.01)

(58) Field of Classification Search
CPC .............................................. B60R 2021/0053
See application file for complete search history.

(56) References Cited

U.S. PATENT DOCUMENTS

| | | | |
|---|---|---|---|
| 5,695,242 A * | 12/1997 | Brantman | B60N 2/4221 280/730.1 |
| 6,296,292 B1 * | 10/2001 | Feldman | B60N 2/4221 280/728.2 |
| 6,682,141 B2 * | 1/2004 | Reynolds | B60N 2/42763 297/216.1 |
| 7,306,257 B2 | 12/2007 | Koshikawa et al. | |
| 7,784,866 B2 | 8/2010 | Koshikawa et al. | |
| 7,841,655 B2 | 11/2010 | Koshikawa et al. | |
| 8,702,121 B2 * | 4/2014 | Yamashita | B60R 21/207 280/730.1 |
| 9,428,137 B2 | 8/2016 | Lee | |
| 9,643,521 B2 * | 5/2017 | Frommann | B60N 2/42709 |
| 9,994,138 B2 * | 6/2018 | Whitens | B60N 2/42763 |
| 10,589,646 B2 | 3/2020 | Komura et al. | |
| 10,864,877 B2 * | 12/2020 | Nagasawa | B60R 21/207 |
| 2003/0151234 A1 * | 8/2003 | Ruel | B60R 21/207 280/730.1 |
| 2006/0119149 A1 * | 6/2006 | Yoshikawa | B60N 2/42718 297/216.1 |
| 2006/0267325 A1 * | 11/2006 | Kumagai | B60N 2/42718 280/753 |
| 2019/0337427 A1 * | 11/2019 | Thomas | B60N 2/427 |
| 2020/0070768 A1 * | 3/2020 | Mori | B60R 21/207 |

* cited by examiner

*Primary Examiner* — Faye M Fleming
(74) *Attorney, Agent, or Firm* — Frank A. MacKenzie; Bejin Bieneman PLC

(57) ABSTRACT

A seat includes a seatback. The seat includes a seat bottom extending away from the seatback in a seat-forward direction to a front of the seat bottom distal to the seatback. The seat bottom has a top surface defining an occupant-leg area. The seat includes an airbag supported by the seat bottom at the front of the seat bottom and inflatable from an uninflated position to an inflated position. The airbag in the inflated position extends away from the seat bottom in the seat-forward direction and includes an uppermost surface positioned below the occupant-leg area of the seat bottom.

18 Claims, 4 Drawing Sheets

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A seat includes a seatback. The seat includes a seat bottom extending away from the seatback in a seat-forward direction to a front of the seat bottom distal to the seatback. The seat bottom has a top surface defining an occupant-leg area. The seat includes an airbag supported by the seat bottom at the front of the seat bottom and inflatable from an uninflated position to an inflated position. The airbag in the inflated position extends away from the seat bottom in the seat-forward direction and includes an uppermost surface positioned below the occupant-leg area of the seat bottom.

The seat bottom may include a covering and the airbag may be internal of the covering in the uninflated position and external of the covering in the inflated position.

The airbag in the inflated position may be elongated along a cross-seat axis.

The uppermost surface of the airbag may be above the top surface of the seat bottom in the inflated position.

The seat bottom may include a seat pan, and the airbag may be supported by the seat pan.

The seat pan may include a front surface and the airbag may be fixed to the front surface.

The seat bottom may include a frame and the airbag in the inflated position may extend below the frame.

The airbag in the inflated position may be narrower than the seat bottom along a cross-seat axis.

The seat may include a soft pack housing supporting the airbag.

A vehicle includes a floor. The vehicle includes a seat supported by the floor and facing a rear of the vehicle. The seat includes a seat bottom and a seatback. The seat bottom has a top surface defining an occupant-leg area. The vehicle includes an airbag supported by the seat bottom opposite the seatback. The airbag is inflatable from an uninflated position to an inflated position. The airbag in the inflated position extends away from the seat bottom toward the rear of the vehicle and including an uppermost surface positioned below the occupant-leg area of the seat bottom.

The airbag in the inflated position may be between the floor and the occupant-leg area of the seat bottom along a vehicle-vertical axis.

The seat bottom may include a covering, the airbag may be internal of the covering in the uninflated position and external of the covering in the inflated position.

The uppermost surface of the airbag may be above the top surface of the seat bottom.

The seat bottom may include a seat pan, and the airbag may be supported by the seat pan.

The seat pan may include a front surface, and the airbag may be fixed to the front surface.

The seat bottom may include a frame, the airbag in the inflated position may extend below the frame.

The airbag in the inflated position may be between the front of the seat bottom and legs of an occupant of the seat along a seat-forward direction.

Figure 1:
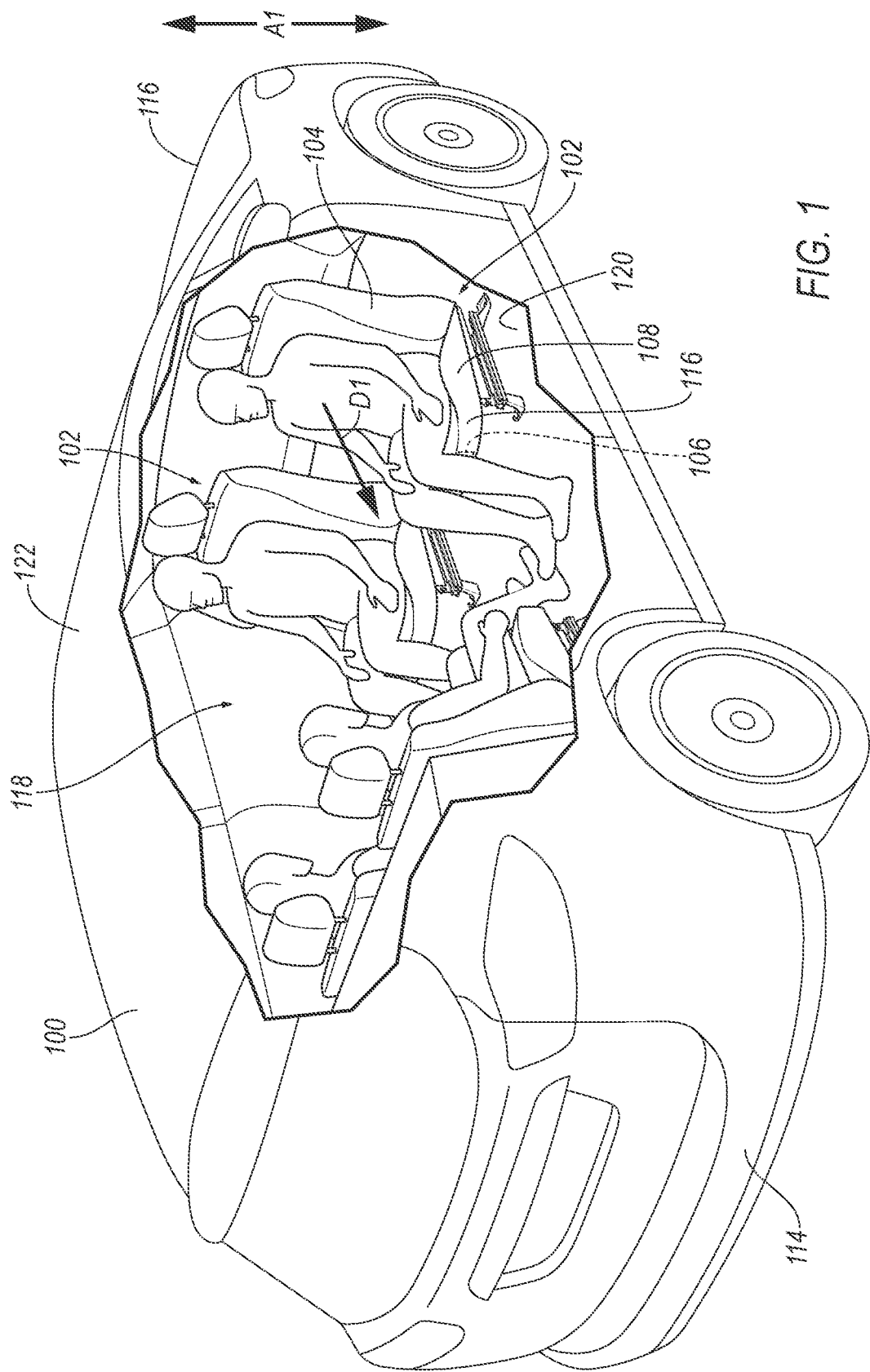
FIG. 1 is a perspective view of a vehicle broken away to show a seat of the vehicle.

With reference to FIG. 1, wherein like numerals indicate like parts throughout the several views, a vehicle 100 includes a seat 102. The seat 102, illustrated in FIGS. 1-5, includes a seatback 104. The seat 102 includes a seat bottom 108 extending away from the seatback 104 in a seat-forward direction D1 to a front 110 of the seat bottom 108 distal to the seatback 104. The seat bottom 108 has a top surface 140 defining an occupant-leg area 126. An airbag 106 is supported by the seat bottom 108 at the front 110 of the seat bottom 108. The airbag 106 is inflatable from an uninflated position, illustrated in FIGS. 2 and 3, to an inflated position, illustrated in FIGS. 4 and 5. The airbag 106 in the inflated position extends away from the seat bottom 108 in the seat-forward direction D1 and includes an uppermost surface 112 positioned below the occupant-leg area 126 of the seat bottom 108.

The airbag 106 in the inflated position controls kinematics of legs L of the occupant relative to the seat 102. For example, the airbag 106 in the inflated position may limit movement of the legs L of the occupant toward the seat 102 when the seat 102 faces a rear 114 of the vehicle 100 and during an impact to a front 116 of the vehicle 100.

The vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input.

The vehicle 100 may define a passenger cabin 118 to house occupants, if any, of the vehicle 100. The passenger cabin 118 may extend across the vehicle 100, i.e., from one side to the other side of the vehicle 100. The passenger cabin 118 includes a front end and a rear end with the front end being in front of the rear end during forward movement of the vehicle 100.

The vehicle 100 includes a floor 120. The floor 120 supports objects, such as the seat 102, in the passenger cabin 118. The floor 120 is at a bottom of the passenger cabin 118.

The vehicle 100 may include a roof 122. The roof 122 covers and encloses the passenger cabin 118. The roof 122 is at a top of the passenger cabin 118.

The seats 102 may be arranged in the passenger cabin 118 in any suitable position, i.e., as front seats, rear seats, third-row seats, etc. The seats 102 may be movable relative to the floor to various positions, e.g., movable fore-and-aft and/or cross-vehicle. The seats 102 may be of any suitable type, e.g., a bucket seat, a bench seat, etc. Any number or all of the seats 102 may include at least one airbag 106. Each seat 102 may rotate about a vertical axis A1 that extends through the roof and the floor. For example, the seat 102 may rotate between a forward-facing position, a rearward-facing position, a rightward-facing position, a leftward-facing position, and/or positions therebetween. In the forward-facing position, the occupant of the seat 102 faces the front 116. In the rearward-facing position the occupant of the seat faces the rear 114. The seat 102 may rotate completely, i.e., 360°, about the vertical axis A1. The seat 102 may rotate between fixed positions, e.g., the forward-facing position and the rearward-facing position, or may be rotatable to an infinite number of positions.

Each seat 102 defines a respective cross-seat axis A2 that extends between sides 124 of the seat 102. The cross-seat axis A2 is perpendicular to the vertical axis A1 and the seat-forward direction D1.

Figure 3:
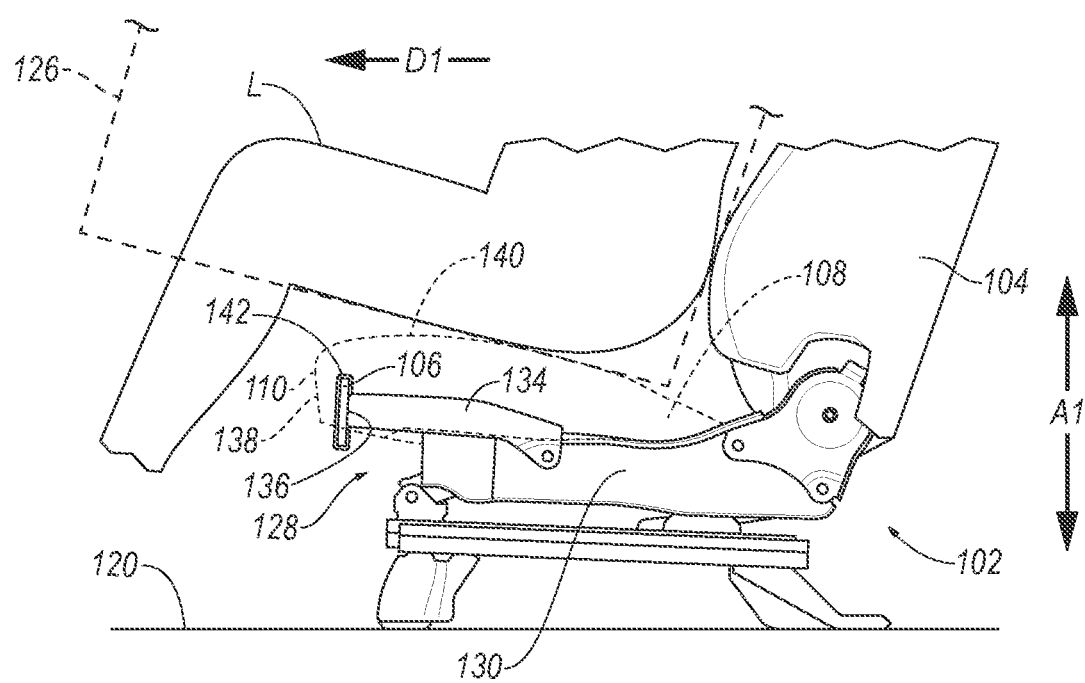
FIG. 3 is a side view of the seat having the airbag in the uninflated position.
Figure 5:
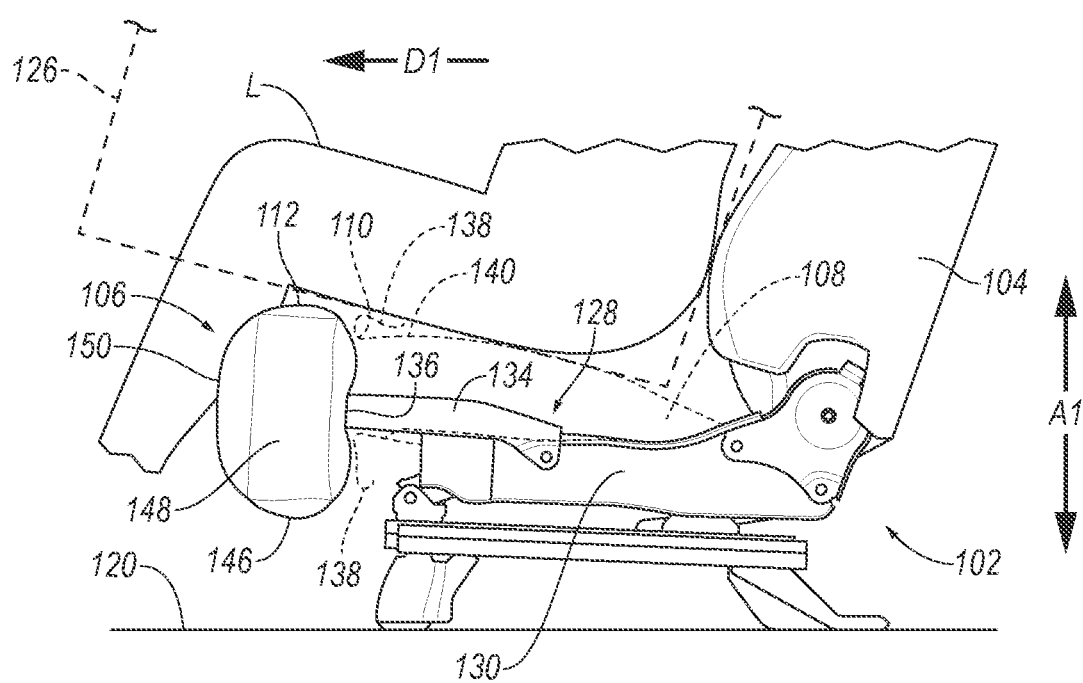
FIG. 5 is a side view of the seat having the airbag in the inflated position.

The seat bottom 108 of each seat 102 defines an occupant-leg area 126, illustrated in FIGS. 3 and 5. The occupant-leg area 126 is the area occupied by legs of an occupant when seated on the seat bottom 108. The occupant-leg area 126 may be above the seat bottom 108 along the vertical axis A2. The occupant-leg area 126 may extend in the seat-forward direction D1 from the seatback 104.

Each seat 102 may define a seat-forward direction D1. The seat-forward direction D1 extends forward relative to the seat 102. For example, the seat-forward direction D1 may extend from the seatback 104 toward the front 110 of the seat 102, i.e., the occupant of the seat 102 faces in the seat-forward direction D1.

Each seat 102 includes the respective seatback 104 and seat bottom 108. The seatback 104 may be supported by the seat bottom 108 and may be stationary or movable relative to the seat bottom 108. The seat bottom 108 extends away from the seatback 104 in the seat-forward direction D1. The seatback 104 and the seat bottom 108 may be adjustable in multiple degrees of freedom. Specifically, the seatback 104 and the seat bottom 108 may themselves be adjustable, in other words, adjustable components within the seatback 104 and/or the seat bottom 108, and/or may be adjustable relative to each other.

The seat bottom 108 can include a frame 128. The frame 128 may include tubes, beams, etc. Specifically, the frame 128 may include a pair of frame members 130 elongated in the seat-forward direction D1, e.g., between the seatback 104 and the front 110 of the seat bottom 108. The frame members 130 are spaced from each other along the cross-seat axis A2. The frame 128 may include cross-members 132 extending between the frame members 130. The cross-member may be elongated along the cross-seat axis A2. The frame 128 can include a seat pan 134. The seat pan 134 may be generally planar and extend from one of the frame members 130 to the other of the frame members 130, e.g., along the cross-seat axis A2. The seat pan 134 may be fixed to the frame members 130. The seat pan 134 may extend from the front 110 of the seat bottom 108 toward the seatback 104. The seat pan 134 may include a front surface 136. The front surface 136 of the seat pan 134 may be at the front 110 of the seat bottom 108. The front surface 136 may face the seat-forward direction D1. The frame 128, including the frame members 130, the cross-members 132, and the seat pan 134 may be of any suitable plastic material, e.g., carbon fiber reinforced plastic (CFRP), glass fiber-reinforced semi-finished thermoplastic composite (organosheet), etc. As another example, some or all components of the frame 128 may be formed of a suitable metal, e.g., steel, aluminum, etc.

The seat bottom 108 can include a covering 138. The covering 138 may include upholstery and padding. The upholstery may be cloth, leather, faux leather, or any other suitable material. The upholstery may be stitched in panels around the frame 128 and the seat pan 134. The padding may be between the upholstery and the frame 128 and the seat pan 134. The padding may be foam or any other suitable material.

The seat bottom 108 includes the top surface 140. The top surface 140 may be an outer surface of the covering 138 and facing upward. The top surface 140 may be a class-A surface, i.e., a finished surface exposed to view by a customer and free of unaesthetic blemishes and defects. The occupant of the seat 102 may sit upon the top surface 140.

The airbag 106 controls kinematics of legs L of the occupant of the seat 102. The airbag 106 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 106 may include a single sheet of woven material or multiple sheets of woven material stitched, or otherwise fixed, to each other.

Figure 2:
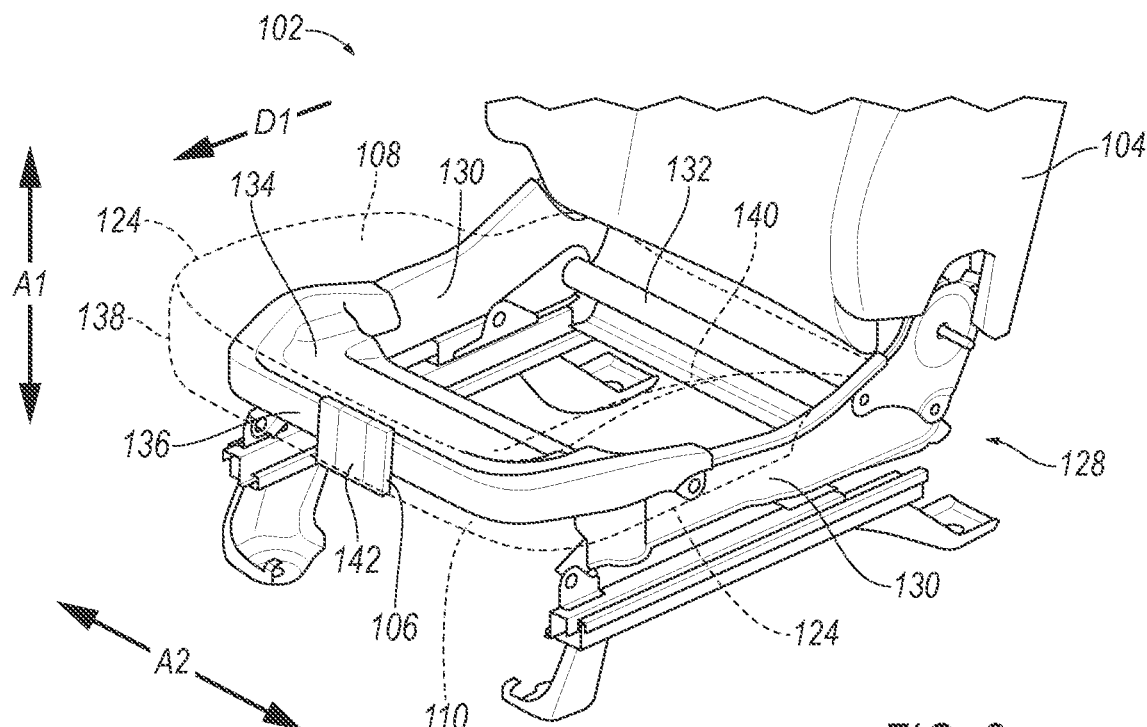
FIG. 2 is a perspective view of the seat having an airbag in an uninflated position.
Figure 4:
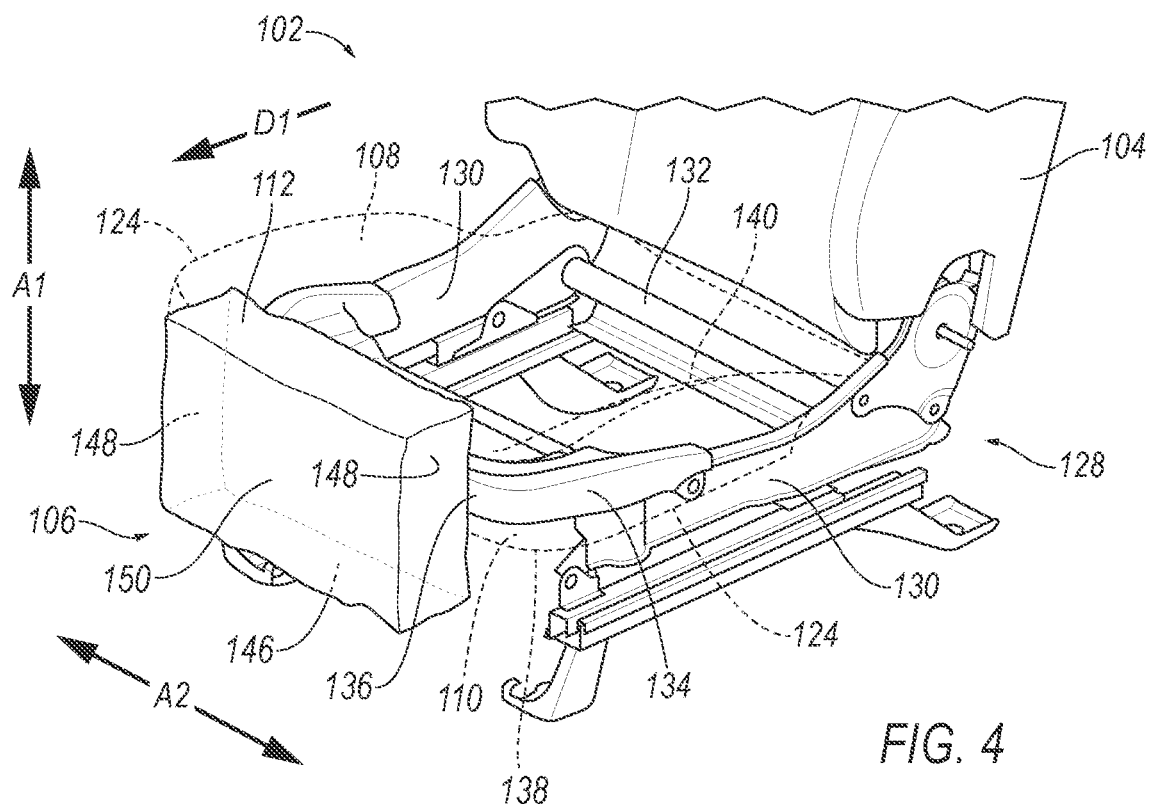
FIG. 4 is a perspective view of the seat having the airbag in an inflated position.

The airbag 106 is inflatable from the uninflated position, illustrated in FIGS. 2 and 3, to the inflated position, illustrated in FIGS. 4 and 5. The airbag 106 in the uninflated position is internal of the covering 138. In other words, the airbag 106 in the uninflated position is between seat pan 134 and the covering 138. The airbag 106 in the inflated position is external of the covering 138 in the inflated position. In other words, the airbag 106 in the inflated position may extend from the seat pan 134 beyond covering 138, e.g., through a tear seam of the covering 138 that is torn upon inflation of the airbag 106.

The airbag 106 is supported by the seat bottom 108 at the front 110 of the seat bottom 108 and distal to, e.g., opposite, the seatback 104. The airbag 106 may be supported by the seat pan 134. For example, the airbag 106 may be supported by, e.g., fixed to, the front surface 136 of the seat pan 134. The airbag 106 may be supported by the seat bottom 108 via a soft pack housing 142. The soft pack housing 142 supports the airbag 106 without rigid structures that may be felt by the occupant of the seat 102. For example, the soft pack housing 142 may include a fabric strap that surrounds the airbag 106 in the uninflated position. The fabric strap may tear, or otherwise free the airbag 106, upon inflation of the airbag 106.

The uppermost surface 112 of the airbag 106 is the at the highest vertical point of the airbag when the airbag 106 is in the inflated position. The uppermost surface 112 of the airbag 106 in the inflated position is spaced from and opposite a bottom surface 146. The bottom surface 146 is between the uppermost surface 112 and the floor 120. The uppermost surface 112 and the bottom surface 146 may extend along the seat-forward direction D1 and along the cross-seat axis A2. The uppermost surface 112 may generally face upward, e.g., toward the roof 122. The bottom surface 146 may generally face downward, e.g., toward to floor 120. The airbag 106 may include opposing side surfaces 148 spaced from each other along the cross-seat axis A2. The side surfaces 148 may extend along the vertical axis A1 and the seat-forward direction D1. One of the side surfaces 148 may generally face to the right of the seat 102 and another of the side surfaces 148 may generally face to the left of the seat 102. The airbag 106 may include a front surface 150. The front surface 150 may extend along the vertical axis A1 and the cross-seat axis A2. The front surface 150 may generally face the seat-forward direction D1. The airbag 106 in the inflated position may be rectangular, or and suitable shape.

The airbag 106 in the inflated position controls kinematics of legs L of the occupant relative to the seat 102. For example, the airbag 106 in the inflated position may restrict movement of the legs L toward the seat 102. As another example, the airbag 106 may inhibit the legs L from contacting the seat 102.

The airbag 106 in the inflated position extends away from the seat bottom 108 in the seat-forward direction D1 and is between the front 110 of the seat bottom 108 and the legs L of the occupant of the seat 102 along the seat-forward direction D1. For example, the front surface 150 of the airbag 106 may be spaced from the front 110 of the seat 102 in the seat-forward direction D1. As another example, when the seat 102 is rear-facing, the airbag 106 may extend from the seat 102 toward the rear 114 of the vehicle 100. The front surface 150 may be positioned behind legs L of the occupant of the seat 102 relative to the seat-forward direction D1. For example, lower portions of the legs L (e.g., calves) may be forward of the front surface 150 of the airbag 106 along the seat-forward direction D1.

The airbag 106 in the inflated position is between the floor 120 and the occupant-leg area 126 of the seat 102 along the vertical axis A1. The uppermost surface 112 of the airbag 106 may be below the occupant-leg area 126, i.e., such that the legs L of the occupant may extend over and in front 116 of the airbag 106 in the inflated position. For example, the uppermost surface 112 may be positioned below the legs L of the occupant of the seat 102. The uppermost surface 112 may abut a backside of the legs L. The uppermost surface 112 of the airbag 106 may be above the top surface 140 of the seat bottom 108 along the vertical axis A1. For example, the top surface 140 of the seat bottom 108 at the front 110 of the seat bottom 108 may be closer to the floor 120 than the uppermost surface 112 of the airbag 106.

The airbag 106 in the inflated position extends below the frame 128 along the vertical axis A1, e.g., inhibiting the legs L of the occupant from contacting the frame 128. For example, the bottom surface 146 of the airbag 106 may be below the front surface 136 of the seat pan 134. As another example, the bottom surface 146 of the airbag 106 may be closer to the floor 120 than the seat pan 134.

The airbag 106 in the inflated position may be elongated along the cross-seat axis A2. In other words, the airbag 106 in the inflated position may be longest along the cross-seat axis A2. For example, a distance between the side surfaces 148 along the cross-seat axis A2 may be greater than a distance between the uppermost surface 112 and the bottom surface 146 along the vertical axis A1 and a distance between the seat bottom 108 (e.g., the front surface 136 of the seat pan 134) and the front surface 150 of the airbag 106 along the seat-forward direction D1.

The airbag 106 in the inflated position may be narrower than the seat bottom 108. In other words, a distance between right and left sides 124 of the seat bottom 108 may be greater than a distance between the side surfaces 148 of the airbag 106 along the cross-seat axis A2. For example, both of the side surfaces 148 may be between the right and left sides 124 of the seat bottom 108 along the cross-seat axis A2.

Figure 6:
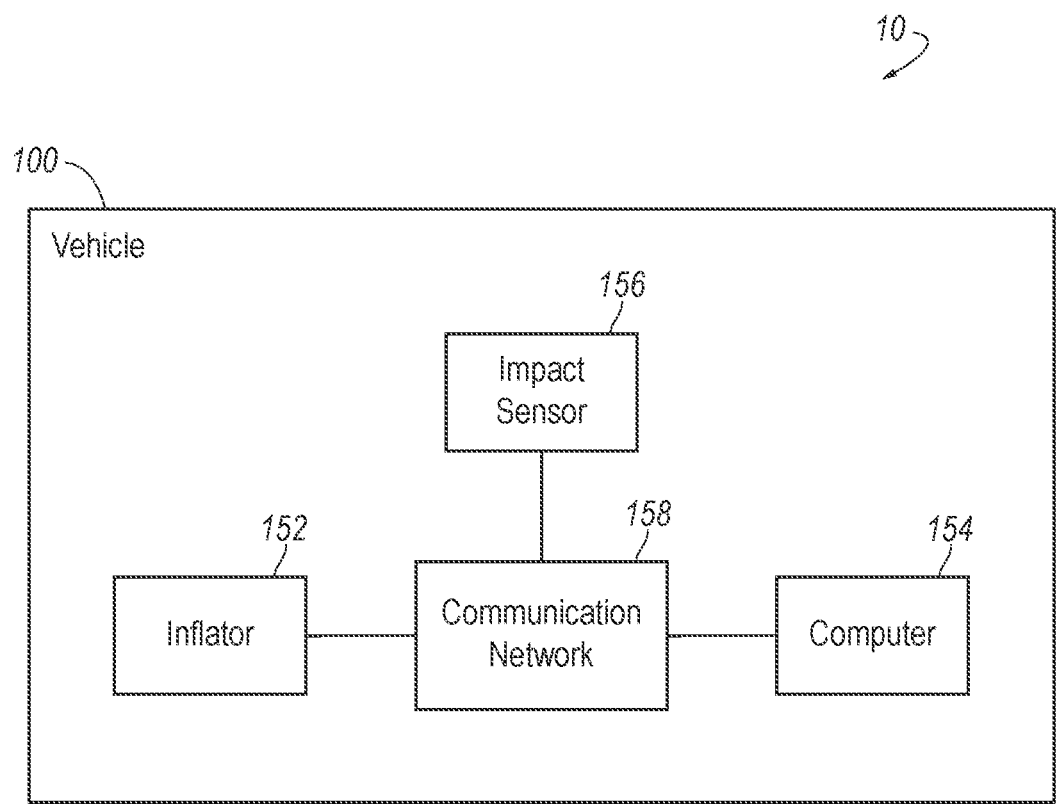
FIG. 6 is a block diagram of components of the vehicle.

With reference to FIG. 6, an inflator 152 may be connected to the airbag 106. Upon receiving a signal from, e.g., a computer 154, the inflator 152 may inflate the airbag 106 with an inflatable medium, such as a gas. The inflator 152 may be, for example, a pyrotechnic inflator that uses a chemical reaction to drive inflation medium to the airbag 106. The inflator 152 may be of any suitable type, for example, a cold-gas inflator. The inflator 152 may be disposed in the housing 142.

The vehicle 100 may include at least one impact sensor 156 for sensing impact of the vehicle 100. The impact sensor 156 is configured to detect an impact to the vehicle 100. The impact sensor 156 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 156 may be located at numerous points in or on the vehicle 100. Alternatively or additionally to sensing impact, the impact sensor 156 may be configured to sense impact prior to impact, i.e., pre-impact sensing.

The computer 154 includes a processor and a memory such as are known. The memory includes one or more forms of computer 154 readable media, and stores instructions executable by the computer 154 for performing various operations, including as disclosed herein. The computer 154 is generally arranged for communications on a vehicle communication network 158 that can include a bus in the vehicle 100 such as a controller area network (CAN) or the like, and/or other wired and/or wireless mechanisms. Via the vehicle communication network 158, the computer 154 may transmit messages to various devices in the vehicle 100, e.g., to the inflator 152, and/or receive messages (e.g., CAN messages) from the various devices, e.g., from the impact sensor 156.

The computer 154 is programmed to, i.e., the memory stores instructions executable by the processor to, deploy the airbag 106. For example, the computer 154 may transmit a command, e.g., an impulse, to the inflator 152 via the communication network 158. The computer 154 may deploy the airbag 106 in response to detecting a vehicle impact. For example, the impact sensor 156 may sense an impact to the vehicle 100 and transmit a message specifying such impact via the communication network 158 to the computer 154. Upon receiving such message, the computer 154 may transmit a command via the communication network 158 to the inflator 152 to deploy the airbag 106. The airbag 106 in the inflated position controls kinematics of legs L of the occupant of the seat 102, e.g., limiting movement of the legs L toward the seat 102 during the detected impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seat, comprising:
a seatback;
a seat bottom extending away from the seatback in a seat-forward direction to a front of the seat bottom distal to the seatback, the seat bottom having a top surface defining an occupant-leg area, the seat bottom having a front surface facing the seat-forward direction; and
an airbag supported by the front surface of the seat bottom at the front of the seat bottom and inflatable from an uninflated position to an inflated position, the airbag in the inflated position extending away from the seat bottom in the seat-forward direction and including an uppermost surface positioned below the occupant-leg area of the seat bottom.

2. The seat of claim 1, wherein the seat bottom includes a covering and the airbag internal of the covering in the uninflated position and external of the covering in the inflated position.

3. The seat of claim 1, wherein the airbag in the inflated position is elongated along a cross-seat axis.

4. The seat of claim 1, wherein the seat bottom includes a covering having an outer surface that provides the top surface of the seat bottom, and wherein the uppermost surface of the airbag is above the top surface of the seat bottom in the inflated position.

5. The seat of claim 1, wherein the seat bottom includes a seat pan, and the airbag is supported by the seat pan.

6. The seat of claim 5, wherein the seat pan includes the front surface and the airbag is fixed to the seat pan at the front surface.

7. The seat of claim 1, wherein the seat bottom includes a frame and the airbag in the inflated position extends below the frame.

8. The seat of claim 1, wherein the airbag in the inflated position is narrower than the seat bottom along a cross-seat axis.

9. The seat of claim 1, further comprising a soft pack housing supporting the airbag.

10. A vehicle, comprising:
a floor;
a seat supported by the floor and facing a rear of the vehicle, the seat including a seat bottom and a seatback, the seat bottom having a front surface facing a seat-forward direction;
the seat bottom having a top surface defining an occupant-leg area; and
an airbag supported by the front surface of the seat bottom opposite the seatback, the airbag inflatable from an uninflated position to an inflated position, the airbag in the inflated position extending away from the seat bottom toward the rear of the vehicle and including an uppermost surface positioned below the occupant-leg area of the seat bottom.

11. The vehicle of claim 10, wherein the airbag in the inflated position is between the floor and the occupant-leg area of the seat bottom along a vehicle-vertical axis.

12. The vehicle of claim 10, wherein the seat bottom includes a covering, the airbag internal of the covering in the uninflated position and external of the covering in the inflated position.

13. The vehicle of claim 10, wherein the seat bottom includes a covering having an outer surface that provides the top surface of the seat bottom, and wherein the uppermost surface of the airbag in the inflated position is above the top surface of the seat bottom.

14. The vehicle of claim 10, wherein the seat bottom includes a seat pan, and the airbag is supported by the seat pan.

15. The vehicle of claim 14, wherein the seat pan includes the front surface, and the airbag is fixed to the seat pan at the front surface.

16. The vehicle of claim 10, wherein the seat bottom includes a frame, the airbag in the inflated position extending below the frame.

17. The vehicle of claim 10, wherein the airbag in the inflated position is between the front of the seat bottom and legs of an occupant of the seat along the seat-forward direction.

18. The seat of claim 1, wherein the airbag in the inflated position extends from the front surface along an axis elongated along the seat bottom from the seat back through the front surface.

* * * * *